(12) United States Patent
Yang

(10) Patent No.: US 10,274,018 B2
(45) Date of Patent: Apr. 30, 2019

(54) MOTOR CONNECTION STRUCTURE OF ENGINE CLUTCH FOR HYBRID TRANSMISSION

(71) Applicant: HYUNDAI MOTOR COMPANY, Seoul (KR)

(72) Inventor: Hong Seok Yang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 138 days.

(21) Appl. No.: 15/373,981

(22) Filed: Dec. 9, 2016

(65) Prior Publication Data

US 2018/0112718 A1   Apr. 26, 2018

(30) Foreign Application Priority Data

Oct. 24, 2016   (KR) .................. 10-2016-0138370

(51) Int. Cl.
*F16D 3/76*   (2006.01)
*F16D 3/12*   (2006.01)
*F16F 15/12*   (2006.01)
*B60K 17/02*   (2006.01)

(52) U.S. Cl.
CPC ............... *F16D 3/12* (2013.01); *B60K 17/02* (2013.01); *F16D 3/76* (2013.01); *F16F 15/12* (2013.01); *B60Y 2306/09* (2013.01); *F16D 2300/22* (2013.01); *Y10S 403/14* (2013.01); *Y10T 403/54* (2015.01); *Y10T 403/7045* (2015.01)

(58) Field of Classification Search
CPC .......... F16D 3/12; F16D 3/78; F16D 2300/22; F16F 15/12; B60Y 2306/09; Y10S 403/14; Y10T 403/54; Y10T 403/7045
USPC ....................... 464/89, 90; 192/204
See application file for complete search history.

(56) References Cited

U.S. PATENT DOCUMENTS

| 3,013,828 | A | * | 12/1961 | Kleinschmidt | F16D 3/16 |
| | | | | | 464/89 |
| 3,377,875 | A | * | 4/1968 | Sand | F16H 7/06 |
| 5,366,413 | A | * | 11/1994 | Yamaguchi | B62D 1/192 |
| | | | | | 464/89 |
| 9,587,682 | B2 | * | 3/2017 | Inagaki | F16D 13/58 |
| 2018/0112719 | A1 | * | 4/2018 | Yang | F16D 3/12 |

FOREIGN PATENT DOCUMENTS

| FR | 1.254.761 | * | 1/1961 | ........... 464/89 |
| JP | 2012-162220 A | | 8/2012 | |
| KR | 10-2001-0067265 A | | 7/2001 | |
| KR | 10-0482116 B1 | | 4/2005 | |
| KR | 10-1459777 B1 | | 11/2014 | |

\* cited by examiner

*Primary Examiner* — Greg Binda
(74) *Attorney, Agent, or Firm* — McDonnell Boehnen Hulbert & Berghoff LLP

(57) ABSTRACT

A motor connection structure may be configured for coupling a rotor of a motor and an engine clutch retainer in the hybrid transmission. An example motor connection structure includes a damping unit coupled to an outer circumferential surface of the retainer in an axial direction of the rotor on an inner side of the rotor and supporting each of (i) the outer circumferential surface of the retainer, (ii) an inner circumferential surface of the rotor, and (iii) a coupled portion of the retainer.

14 Claims, 3 Drawing Sheets

MOTOR CONNECTION STRUCTURE OF ENGINE CLUTCH FOR HYBRID TRANSMISSION

CROSS-REFERENCE TO RELATED APPLICATION

This application claims priority to and the benefit of Korean Patent Application No. 10-2016-0138370 filed in the Korean Intellectual Property Office on Oct. 24, 2016, the entire contents of which are incorporated herein by reference.

BACKGROUND

(a) Technical Field

An example embodiment according to the present disclosure relates to a hybrid transmission for a vehicle, and more particularly, to an engine clutch motor connection structure to selectively transfer power from an engine to a hybrid transmission that provides torque conversions required to drive a vehicle using power from the engine and a motor.

(b) Description of the Related Art

In general, a transmission of a hybrid vehicle using power from an engine and an electric motor is configured to appropriately convert power from the engine and power from the motor and transfer the converted power to driving wheels.

The hybrid transmission has an engine clutch to switch between a first state in which power from the engine is transferred to the inside of the hybrid transmission and a second state in which power from the engine is cut off. For example, the engine clutch may have a multi-plate clutch between a hub connected to the engine and a retainer connected to the transmission.

The engine clutch retainer is coupled to an input shaft of the transmission, and the hub of the engine clutch is connected to the engine. Thus, the engine clutch may vary a power transmission state between the hub and the retainer by the multi-plate clutch.

In addition, the engine clutch retainer may be spline-connected to a rotor of the motor, and power from the motor may be transferred to the transmission through the retainer. That is, the engine clutch retainer may transfer power from the motor to the transmission all of the time, or power from the engine may be selectively transferred to the transmission according to an operation of the engine clutch.

However, as the engine clutch retainer for a hybrid transmission is coupled with the rotor of the motor, the engine clutch retainer for the hybrid transmission has a spline serration gap between the retainer and the rotor, and thus, the retainer collides with the rotor due to a vibration of the engine and makes a rattling noise. Therefore, an improved engine clutch motor connection structure for a hybrid transmission may be desired.

Matters described in the background art section are provided to promote understanding of the background of the present invention, which may include matter that is not prior art known to those skilled in the art to which the present invention pertains.

SUMMARY

The present disclosure addresses the issues raised above by providing an engine clutch motor connection structure for a hybrid transmission having the advantages of absorbing a rotationally-directional vibration of a retainer due to a vibration of an engine, thereby reducing or eliminating rattling noise of the retainer and a rotor.

An example embodiment provides an engine clutch motor connection structure for a hybrid transmission, the motor connection configured for coupling a rotor of a motor and an engine clutch retainer in the hybrid transmission, including: a damping unit coupled to an outer circumferential surface of the retainer in an axial direction of the rotor on an inner side of the rotor and supporting each of (i) the outer circumferential surface of the retainer, (ii) an inner circumferential surface of the rotor, and (iii) a coupled portion of the retainer.

The damping unit may be disposed at a 90-degree interval along a rotational direction of the rotor.

The damping unit may include: a support ring inserted into the outer circumferential surface of the retainer; and a rubber damper provided in the support ring.

The motor connection structure may further include a snap ring supporting an axial directional compression repulsive force of the rubber damper positioned in the coupled portion of the rotor.

The retainer may include a cylindrical retainer body positioned on an inner side of the rotor and a plate-shaped retainer cover fixed to one side of the retainer body and coupled to the rotor.

A plurality of crown portions may protrude from the coupled portion of the rotor in an axial direction of the rotor.

A plurality of radial protrusions may protrude from a coupled portion of the retainer cover in a radial direction of the retainer cover and inserted between the plurality of crown portions.

The damping unit may be coupled to the outer circumferential surface of the retainer body in the axial direction of the rotor on the inner side of the rotor and may be configured to support each of (i) the outer circumferential surface of the retainer body, (ii) the inner circumferential surface of the rotor, and (iii) the plurality of radial protrusions of the retainer cover.

The damping unit may include: a support ring inserted into the outer circumferential surface of the retainer body; and a rubber damper provided in the support ring.

The support ring may be formed of steel.

The support ring may include a first portion supporting the outer circumferential surface of the retainer body; and a second portion bent from the first portion in a radial direction of the retainer body and supporting the plurality of radial protrusions of the retainer cover.

The rubber damper may be vulcanized-bonded to one or more adhesion surfaces of the first and second portions corresponding to the inner circumferential surface of the rotor.

The support ring may have a band shape, may be inserted to the outer circumferential surface of the retainer body, and may support the outer circumferential surface of the retainer body and the plurality of radial protrusions of the retainer cover.

The rubber damper may be vulcanized-bonded to an adhesion surface of the support ring corresponding to the inner circumferential surface of the rotor, and support the inner circumferential surface of the rotor and the plurality of radial protrusions.

The motor connection structure may further include a snap ring supporting an axial directional compression repulsive force of the rubber damper positioned in the plurality of crown portions of the rotor.

Another example embodiment provides an engine clutch motor connection structure for a hybrid transmission, the motor connection structure configured for spline-coupling a rotor of a motor and an engine clutch retainer in the hybrid transmission, including: (a) a plurality of crown portions protruding from a coupled portion of the rotor in an axial direction of the rotor and spaced apart from each other in a circumferential direction; (b) a plurality of radial protrusions protruding from a coupled portion of the retainer in a radial direction and inserted between the plurality of crown portions; (c) a support ring coupled to an outer circumferential surface of the retainer in an axial direction of the rotor and supporting the outer circumferential surface of the retainer and the plurality of radial protrusions; and (d) a rubber damper provided on the support ring and supporting an inner circumferential surface of the rotor.

The retainer may include a cylindrical retainer body positioned on an inner side of the rotor and a plate-shaped retainer cover having the plurality of radial protrusions and coupled to one side of the retainer body.

The support ring may include a first portion supporting the outer circumferential surface of the retainer body and a second portion bent from the first portion in a radial direction of the retainer body and supporting the plurality of radial protrusions.

The rubber damper may be vulcanized-bonded to one or more adhesion surfaces of the first and second portions corresponding to the inner circumferential surface of the rotor.

The support ring may have a band shape and may support the outer circumferential surface of the retainer body and the plurality of radial protrusions.

The rubber damper may be vulcanized-bonded to an adhesion surface of the support ring corresponding to the inner circumferential surface of the rotor, and may support the inner circumferential surface of the rotor and the plurality of radial protrusions.

A snap ring supporting an axial directional compression repulsive force of the rubber damper may be positioned in the plurality of crown portions.

Mounting recesses may be formed in the plurality of crowns, into which the snap ring is inserted.

According to example embodiments of the present invention, a rotational directional vibration of the retainer due to vibration of the engine may be absorbed through the damping unit between the retainer and the rotor, and rattling noise of the retainer and the rotor may be minimized.

DETAILED DESCRIPTION OF THE EMBODIMENTS

Figure 1:
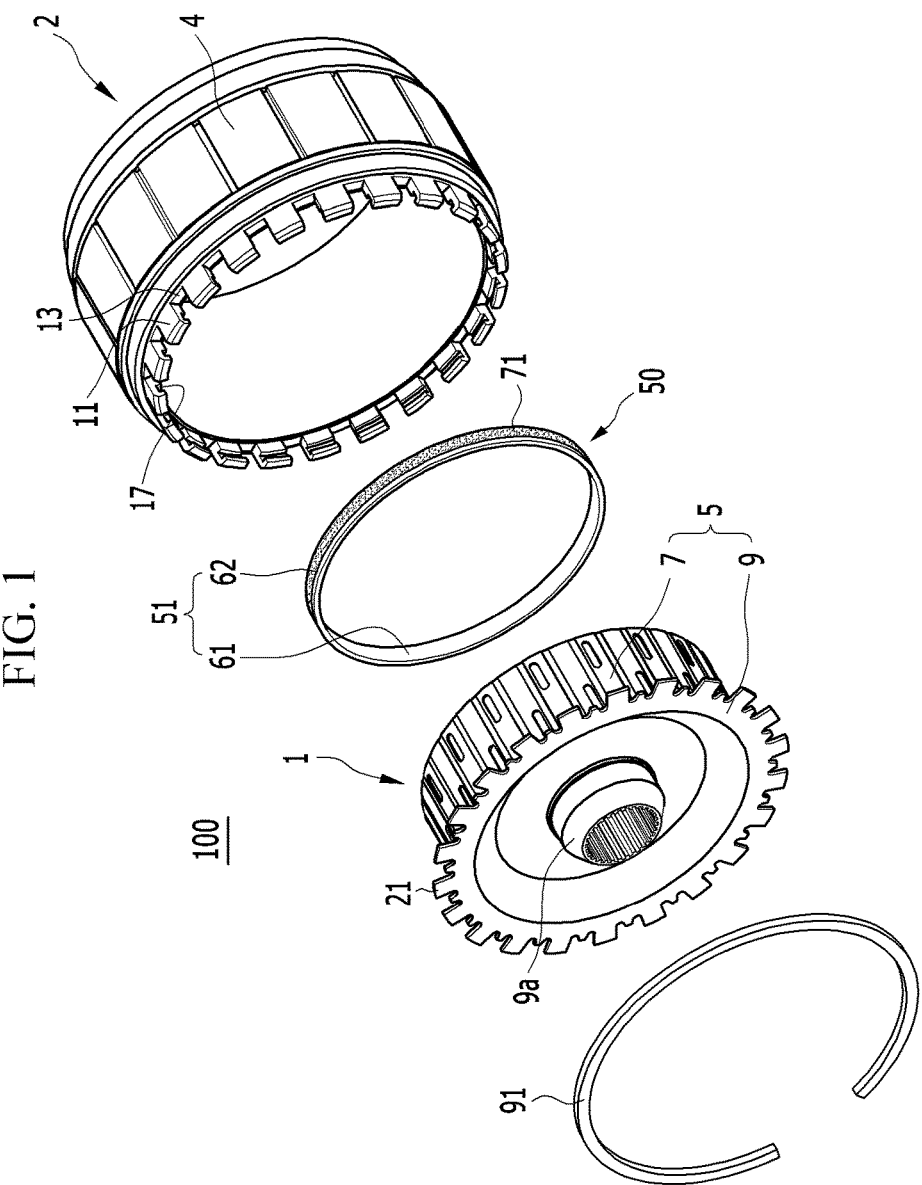
FIG. 1 is an exploded perspective view illustrating an engine clutch motor connection structure for a hybrid transmission, according to an example embodiment.

Hereinafter, example embodiments are described more fully with reference to the accompanying drawings. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the drawings, sizes and thickness of components are arbitrarily shown for the description purposes, so the present invention is not limited to the illustrations of the drawings and thicknesses are exaggerated to clearly express various parts and regions.

In the following descriptions, terms such as "first" and "second," etc., may be used only to distinguish one component from another as pertinent components are named the same, and order thereof is not limited.

Throughout the specification, unless explicitly described to the contrary, the word "comprise" and variations such as "comprises" or "comprising" will be understood to imply the inclusion of stated elements but not the exclusion of any other elements.

The terms "unit", "means", "part", "member", and the like, described in the specification refer to units of comprehensive configuration performing at least one function or operation.

Figure 2:
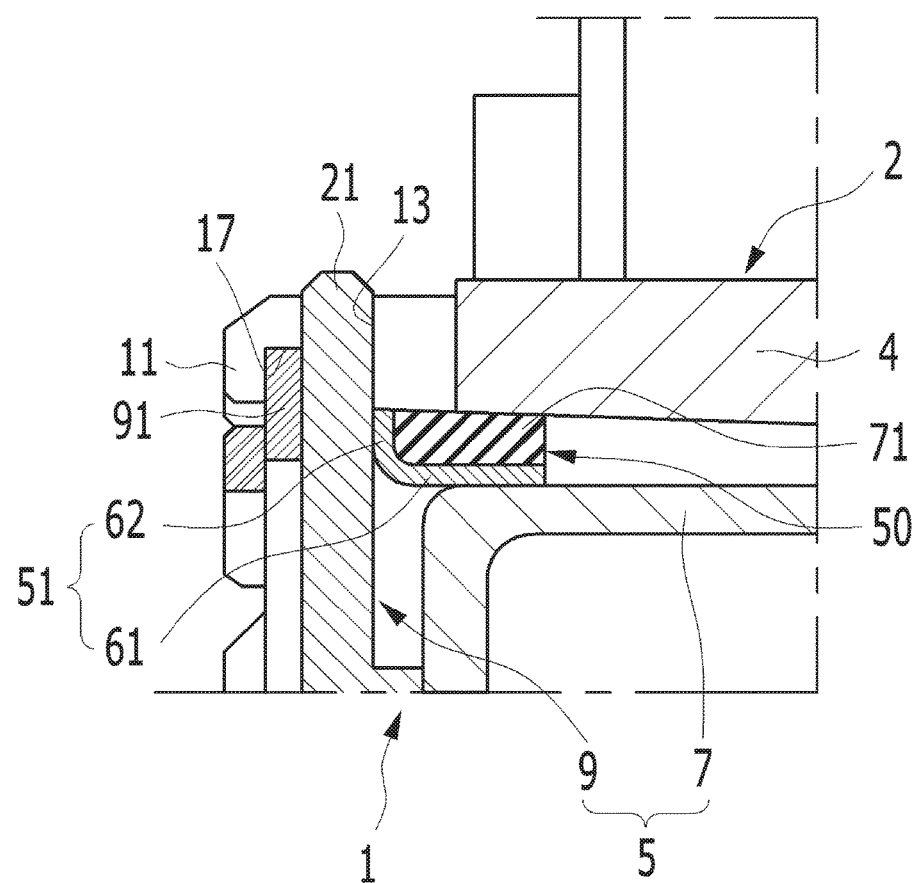
FIG. 2 is a partially coupled cross-sectional view illustrating an engine clutch motor connection structure for a hybrid transmission, according to an example embodiment.

FIG. 1 is an exploded perspective view illustrating an engine clutch motor connection structure for a hybrid transmission according to an example embodiment, and FIG. 2 is a partially coupled cross-sectional view of FIG. 1.

Referring to FIGS. 1 and 2, an engine clutch motor connection structure 100 for a hybrid transmission according to an example embodiment may be applied to a transmission (hybrid transmission) of a hybrid vehicle using power from an engine and an electric motor.

For example, the hybrid transmission has an engine clutch 1 transferring power from the engine or cutting off power transfer from the engine. The engine clutch 1 has a hub (not shown) connected to the engine, a retainer 5 connected to the transmission, and clutch components (not shown) positioned between the hub (not shown) and the retainer 5. Here, the retainer 5 of the engine clutch 1 is coupled to an input shaft of the transmission and the hub (not shown) of the engine clutch 1 is connected to the engine.

The retainer 5 of the engine clutch 1 is coupled to a rotor 4 of a motor 2, and power from the motor 2 is transferred to the transmission through the retainer 5. The rotor 4 described hereinafter may be defined as a cylindrical rotor shaft or rotor sleeve into which the engine clutch 1 is inserted.

In an example embodiment, the retainer 5 includes a cylindrical retainer body 7 and a plate-shaped retainer cover 9 coupled to one side of the retainer body 7.

The retainer body 7 is inserted into an inner side of the rotor 4 such that an outer surface thereof is spaced apart from the inner side of the rotor 4. Multi-plate clutch components (not shown) including a clutch plate and a clutch disk are positioned on an inner side of the retainer body 7. The multi-plate clutch components (not shown) are coupled to an inner circumferential surface of the retainer body 7.

The retainer cover 9 is provided as a disk plate extending in a radial direction, while blocking one side of the retainer body 7, and connected to an end portion of the rotor 4 such that the retainer cover 9 and the rotor are connected to be mutually rotated and restrained. The retainer cover 9 has a retainer boss 9a coupled to the input shaft (not shown) of the transmission.

Here, the end portion of the rotor 4 is coupled to the retainer cover 9, and the portion extending from the retainer cover 9 in a radial direction is a portion coupled to the end portion of the rotor 4.

The retainer body 7 and the retainer cover 9 of the retainer 5 are components of a retainer of an engine clutch for a hybrid transmission of a known art, and thus, detailed descriptions thereof will be omitted in the present disclosure.

In an example embodiment, a plurality of crown portions 11 are formed in the end portion of the rotor 4, that is, in the portion coupled to the retainer cover 9. The crown portions 11 protrude from the end portion of the rotor 4 in an axial direction, and are spaced apart from each other in a concave-convex shape in a rotational direction of the rotor 4.

In an example embodiment, a plurality of radial protrusions 21 are formed in an edge portion of the retainer cover 9, that is, the portion extending in a radial direction and coupled to the end portion of the rotor 4. The radial protrusions 21 protrude from the edge portion of the retainer cover in a radial direction, and are spaced apart from each other in a concave-convex shape along the edge direction.

The radial protrusions 21 are inserted into spaces between the crown portions 11 of the rotor 4 and thus retainer 5 mutually rotates with the rotor 4. An axial directional limiting portion 13 acting as a stopper supporting the radial protrusion 21 is formed in a recess portion between the crown portions 11. The axial directional limiting portion 13 limits an axial directional insertion depth of the retainer 5 with respect to the rotor 4.

In the connection structure of the retainer 5 of the engine clutch 1 and the rotor 4 of the motor 2 as stated above, as the rotor 4 and the retainer 5 are coupled through the crown portions 11 and the radial protrusions 21, a spline serration gap is present between the crown portions 11 and the radial protrusions 21.

The spline serration gap is a major factor leading to the generation of rattling noise as the retainer 5 hits the rotor 4 due to vibration of the engine when the engine clutch 1 rotates due to a rotational motion of an engine crank shaft in a state in which driving torque of the motor is zero and the engine clutch 1 is on.

The engine clutch motor connection structure 100 for a hybrid transmission according to an example embodiment is capable of absorbing the vibration of the retainer in a rotational direction due to engine vibration and removing rattling noise of the retainer 5 and the rotor 4.

The engine clutch motor connection structure 100 for a hybrid transmission according to an example embodiment includes at least one damping unit 50 for removing rattling noise of the retainer 5 and the rotor 4.

In an example embodiment, the damping unit 50 serves to absorb a vibration of the retainer 5 in a rotational direction generated when the retainer 5 hits the rotor 4 due to a serration gap between the retainer 5 and the rotor 4.

The damping unit 50 is provided between the rotor 4 and the retainer 5. Also, the damping unit 50 is coupled to an outer circumferential surface of the retainer 5 in an axial direction of the rotor 4 on an inner side of the rotor 4. The damping unit 50 supports the outer circumferential surface of the retainer 5, an inner circumferential surface of the rotor 4, and a coupled portion of the retainer 5.

Also, the damping unit 50 is coupled to the outer circumferential surface of the retainer body 7 in an axial direction on an inner side of the rotor 4. The damping unit 50 supports the outer circumferential surface of the retainer body 7, the inner circumferential surface of the rotor 4, and the radial protrusions 21 of the retainer cover 9. The damping unit 50 includes a support ring 51 inserted into the outer circumferential surface of the retainer body 7 and a damper 71 provided on the support ring 51.

In an example embodiment, the support ring 51 is coupled to the outer circumferential surface of the retainer body 7 in an axial direction of the rotor 4, and supports the outer circumferential surface of the retainer body 7 and the radial protrusions 21 of the retainer cover 9. The support ring 51 may be formed of steel, for example.

The support ring 51 includes integrally connected first and second portions 61 and 62. The first portion 61 has a band shape and supports the outer circumferential surface of the retainer body 7. The second portion 62 is bent from the first portion 61 in a radial direction of the retainer body 7 and supports the radial protrusions 21 of the retainer cover 9. That is, the second portion 62 is bent from an edge of the first portion 61 corresponding to the radial protrusions 21 of the retainer cover 9 in a radial direction of the retainer body 7.

In an example embodiment, the damper 71 is formed of rubber with elasticity, has an annular shape, and is provided on the support ring 51. The damper 71 may be vulcanized-bonded to one or more adhesion surfaces of the first and second portions 61 and 62 of the support ring 51 corresponding to the inner circumferential surface of the rotor 4. The damper 71 elastically supports the one or more adhesion surfaces of the first and second portions 61 and 62 and elastically supports an inner circumferential surface of the rotor 4.

In a further example embodiment, a snap ring 91 may be positioned in the crown portions 11 of the rotor 4 to support a compression repulsive force of the damper 71 in an axial direction. The snap ring 91 may be mounted on the crown portions 11 of the rotor 4 on an outer cover surface of the retainer cover 9 and supports the radial protrusions 21.

The snap ring 91 may have a "C" shape, may correspond to the radial protrusions 21 of the retainer cover 9, and may be mounted on the crown portions 11 of the rotor 4 on an outer cover surface of the retainer cover 9. In an example embodiment, the snap ring 91 is inserted and mounted on mounting recess 17 formed in the crown portions 11.

An assembling process for and operation of the engine clutch motor connection structure 100 for a hybrid transmission according to an example embodiment is described below in detail with reference to the accompanying drawings.

Referring to an assembling process of the engine clutch motor connection structure 100 for a hybrid transmission according to an example embodiment, first, in an example embodiment, the damping unit 50 is coupled to the outer circumferential surface of the retainer body 7 in an axial direction of the rotor 4. Here, in an example embodiment, the damping unit 50 is coupled to the outer circumferential surface of the retainer body 7 up to the radial protrusions 21 of the retainer cover 9.

Next, in an example embodiment, the retainer body 7 of the retainer 5 is inserted into the inner side of the rotor 4 such that an outer surface of the retainer body 7 is spaced apart from an inner surface of the rotor 4.

Accordingly, the radial protrusions 21 of the retainer cover 9 are inserted between the crown portions 11 of the rotor 4 and an axial directional insertion depth thereof is limited by the axial directional limiting portion 13 between the crown portions 11. Thus, in an example embodiment, the retainer 5 and the rotor 4 may be coupled to be mutually restrained by the crown portions 11 and the radial protrusions 21.

In the damping unit 50, the first portion 61 of the support ring 51 supports the outer circumferential surface of the retainer body 7, and the second portion 62 supports the radial protrusions 21 of the retainer cover 9. The damper 71 elastically supports the adhesion surfaces of the first and second portions 61 and 62 and elastically supports an inner circumferential surface of the rotor 4.

In an example embodiment, the snap ring 91 is mounted on the crown portions 11 of the rotor 4 on an outer cover surface of the retainer cover 9, and here, the snap ring 91 is mounted on the mounting recesses 17 of the crown portions 11. Here, the snap ring 91 supports the radial protrusions 21 on an outer cover surface of the retainer cover 9.

As the damping unit 50 is positioned between the rotor 4 and the retainer 5 through the process as described above, in an example embodiment, when the engine clutch 1 rotates due to a rotational motion of an engine crank shaft in a state in which driving torque of the motor is zero and the engine clutch 1 is on, a vibration of the retainer 5 in a rotational direction may be absorbed by the damper 71 bonded to the support ring 51 of the damping unit 50.

In other words, when a vibration is applied to the retainer 5 in the rotational direction due to engine vibration, in an example embodiment, the vibration is absorbed through the damper 71 of the damping unit 50, and the vibration may be absorbed while compressing the damper 71 between the retainer 5 and the rotor 4. A compression repulsive force in an axial direction acting on the damper 71 may be restrained through the snap ring 91.

Accordingly, in an example embodiment, rattling noise of the retainer 5 and the rotor 4 generated as the retainer 5 hits the rotor 4 due to the explosion vibration of the engine may be reduced.

Figure 3:
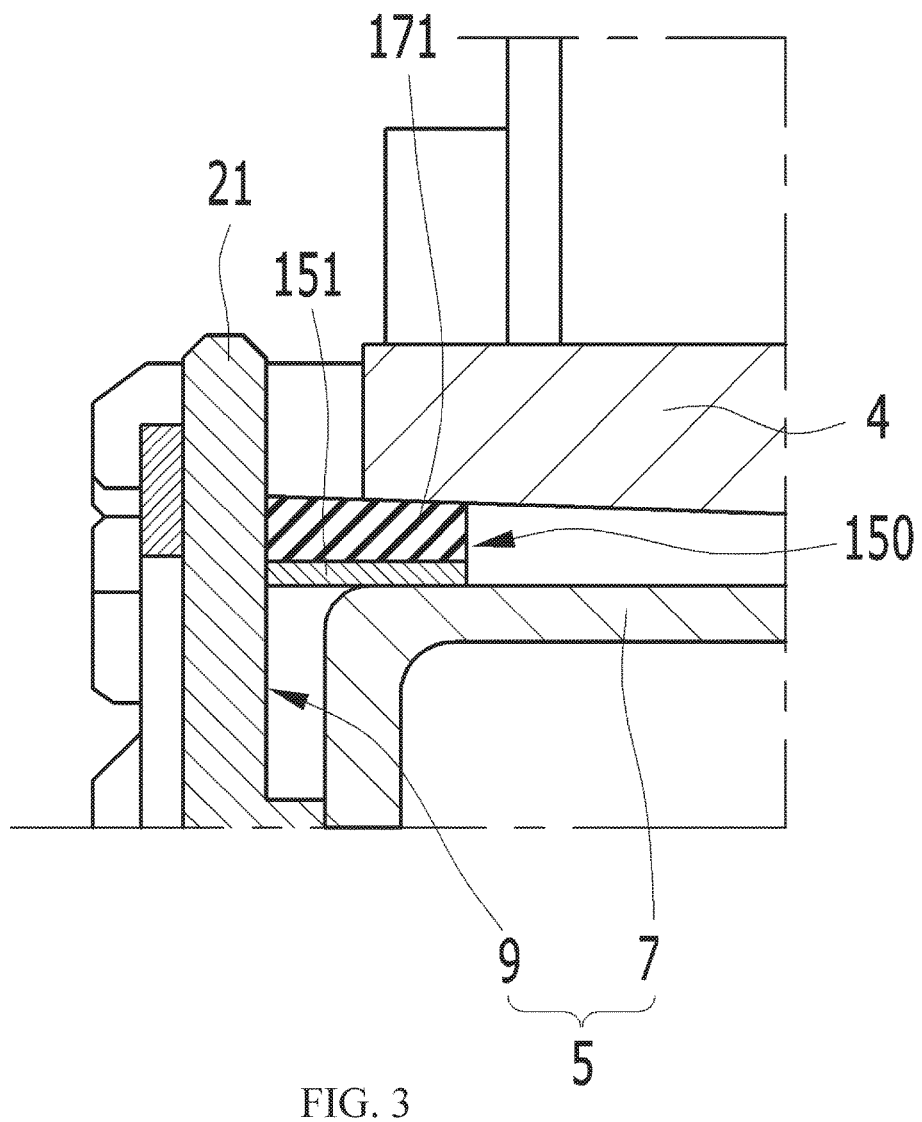
FIG. 3 is a partial cross-sectional view illustrating an engine clutch motor connection structure for a hybrid transmission, according to another example embodiment.

FIG. 3 is a partial cross-sectional view illustrating an engine clutch motor connection structure for a hybrid transmission according to another example embodiment. In FIG. 3, the same components as those of the previous example embodiment will be given the same reference numerals.

Referring to FIG. 3, a motor connection structure 200 of an engine clutch for a hybrid transmission according to another example embodiment may include a damping unit 150 including a band-shaped support ring 151 and a damper 171 provided on the support ring 151, structured as describe in the previous example embodiment.

In another example embodiment, the support ring 151 is inserted to an outer circumferential surface of the retainer body 7 of the retainer 5, and supports the outer circumferential surface of the retainer body 7 and the radial protrusion 21 of the retainer cover 9. Also, the damper 171 may be vulcanized-bonded to an adhesion surface of the support ring 151 corresponding to an inner circumferential surface of the rotor 4, and may support the inner circumferential surface of the rotor 4 and the radial protrusion 21 of the retainer cover 9.

Other components and operational effects of the motor connection structure 200 of an engine clutch for a hybrid transmission according to another example embodiment as described above are the same as those of the previous example embodiment, and thus, detailed descriptions thereof will be omitted.

Hereinabove, example embodiments of the present disclosure have been described in detail with reference to the accompanying drawings. However, the ideas of the present disclosure are not limited thereto and those skilled in the art who understand the ideas of the present invention may easily propose any other embodiments within the scope of the present invention through addition, change, deletion, and the like, and those embodiments will also be within the scope of the present invention.

What is claimed is:

1. An engine clutch motor connection structure for a hybrid transmission, the motor connection configured for coupling a rotor of a motor and an engine clutch retainer in the hybrid transmission, the motor connection structure comprising:
   a damping unit coupled to an outer circumferential surface of the retainer on an inner side of the rotor; and supporting each of (i) the outer circumferential surface of the retainer, (ii) an inner circumferential surface of the rotor, and (iii) a coupled portion of the retainer; and
   a snap ring supporting an axial directional compression repulsive force of the damper positioned in the coupled portion of the rotor;
   wherein the damping unit includes a support ring inserted into the outer circumferential surface of the retainer and a damper provided in the support ring.

2. The motor connection structure of claim 1, wherein the damper is composed of rubber.

3. The motor connection structure of claim 1, wherein:
   the retainer includes a cylindrical retainer body positioned on an inner side of the rotor and a plate-shaped retainer cover fixed to one side of the retainer body and coupled to the rotor; and
   a plurality of crown portions protruding from a coupled portion of the rotor in an axial direction of the rotor, and a plurality of radial protrusions protruding from a coupled portion of the plate-shaped retainer cover in a radial direction of the retainer cover and inserted between the plurality of crown portions.

4. The motor connection structure of claim 3, wherein:
   the damping unit is coupled to an outer circumferential surface of the retainer body in the axial direction of the rotor on the inner side of the rotor and is configured to support each of (i) the outer circumferential surface of the retainer body, (ii) the inner circumferential surface of the rotor, and (iii) the plurality of radial protrusions of the retainer cover.

5. The motor connection structure of claim 1, wherein the support ring is formed of steel.

6. The motor connection structure of claim 5, wherein the support ring includes:
   a first portion supporting the outer circumferential surface of the retainer body; and
   a second portion bent from the first portion in a radial direction of the retainer body and supporting the plurality of radial protrusions of the retainer cover.

7. The motor connection structure of claim 6, wherein:
   the damper is vulcanized-bonded to one or more adhesion surfaces of the first portion and second portion corresponding to the inner circumferential surface of the rotor.

8. The motor connection structure of claim 5, wherein:
   the support ring has a band shape, is inserted into the outer circumferential surface of the retainer body, and supports the outer circumferential surface of the retainer body and the plurality of radial protrusions of the retainer cover, and
   the damper is vulcanized-bonded to an adhesion surface of the support ring corresponding to the inner circumferential surface of the rotor, and the damper supports the inner circumferential surface of the rotor and the plurality of radial protrusions.

9. An engine clutch motor connection structure for a hybrid transmission, the motor connection configured for spline-coupling a rotor of a motor and an engine clutch retainer in the hybrid transmission, the motor connection structure comprising:
 a plurality of crown portions protruding from a coupled portion of the rotor in an axial direction of the rotor and spaced apart from each other in a circumferential direction;
 a plurality of radial protrusions protruding from a coupled portion of the retainer in a radial direction and inserted between the plurality of crown portions;
 a support ring coupled to an outer circumferential surface of the retainer, and supporting the outer circumferential surface of the retainer and the plurality of radial protrusions; and
 a damper provided on the support ring and supporting an inner circumferential surface of the rotor.

10. The motor connection structure of claim 9, wherein the damper is composed of rubber.

11. The motor connection structure of claim 9, wherein:
 the retainer includes a cylindrical retainer body positioned on an inner side of the rotor and a plate-shaped retainer cover having the plurality of radial protrusions and coupled to one side of the retainer body,
 the support ring includes a first portion supporting the outer circumferential surface of the retainer body and a second portion bent from the first portion in a radial direction of the retainer body and supporting the plurality of radial protrusions, and
 the damper is vulcanized-bonded to one or more adhesion surfaces of the first and second portions corresponding to the inner circumferential surface of the rotor.

12. The motor connection structure of claim 9, wherein:
 the retainer includes a cylindrical retainer body positioned on an inner side of the rotor and a plate-shaped retainer cover having the plurality of radial protrusions and coupled to one side of the retainer body,
 the support ring has a band shape and supports the outer circumferential surface of the retainer body and the plurality of radial protrusions, and
 the damper is vulcanized-bonded to an adhesion surface of the support ring corresponding to the inner circumferential surface of the rotor, and the rubber damper supports the inner circumferential surface of the rotor and the plurality of radial protrusions.

13. The motor connection structure of claim 9, further comprising:
 a snap ring supporting an axial directional compression repulsive force of the rubber damper positioned in the plurality of crown portions.

14. The motor connection structure of claim 13, further comprising:
 mounting recesses formed in the plurality of crowns, into which the snap ring is inserted.

* * * * *